(12) United States Patent
Hettinger et al.

(10) Patent No.: US 12,212,354 B2
(45) Date of Patent: Jan. 28, 2025

(54) METHODS AND APPARATUS FOR A WEARABLE COMMAND CENTER

(71) Applicant: SKT2 LLC, Camas, WA (US)

(72) Inventors: Eric Nathan Hettinger, Camas, WA (US); Devin Kimball Ellsworth, Washougal, WA (US); Jonathan R. Wren, Vancouver, WA (US); Garett Schwindel, Camas, WA (US); Jack Harrison Dodd, Vancouver, WA (US); Julian Alejo Osorio, Vancouver, WA (US)

(73) Assignee: SKT2 LLC, Vancouver, WA (US)

( * ) Notice: Subject to any disclaimer, the term of this patent is extended or adjusted under 35 U.S.C. 154(b) by 343 days.

(21) Appl. No.: 17/636,323

(22) PCT Filed: Aug. 27, 2020

(86) PCT No.: PCT/US2020/048164
§ 371 (c)(1),
(2) Date: Feb. 17, 2022

(87) PCT Pub. No.: WO2021/041647
PCT Pub. Date: Mar. 4, 2021

(65) Prior Publication Data
US 2022/0302947 A1 Sep. 22, 2022

Related U.S. Application Data

(60) Provisional application No. 62/892,189, filed on Aug. 27, 2019.

(51) Int. Cl.
*H04B 1/3888* (2015.01)
*A45F 5/00* (2006.01)
*F16M 13/04* (2006.01)

(52) U.S. Cl.
CPC ............. *H04B 1/3888* (2013.01); *A45F 5/00* (2013.01); *F16M 13/04* (2013.01); *A45F 2200/0516* (2013.01)

(58) Field of Classification Search
CPC .............. A45F 2200/0525; A45F 5/00; A45F 2200/0516; H04B 1/3888; H04B 1/3877; H04B 1/385; H04B 2001/3855; H04B 13/005; F16M 13/04
See application file for complete search history.

(56) References Cited

U.S. PATENT DOCUMENTS

| | | | |
|---|---|---|---|
| 10,439,322 B1 * | 10/2019 | Miller | H01R 13/5219 |
| 12,053,082 B1 * | 8/2024 | Swan | A45F 5/00 |
| 2007/0164987 A1 * | 7/2007 | Graham | B60R 11/0241 345/7 |
| 2008/0040960 A1 * | 2/2008 | Keith | G06F 1/163 40/586 |
| 2008/0216287 A1 * | 9/2008 | Suh | G06F 1/1616 16/262 |
| 2016/0154426 A1 * | 6/2016 | Daley, III | G06F 1/1628 361/679.03 |
| 2017/0068270 A1 * | 3/2017 | Kielland | G06F 1/1647 |
| 2018/0140078 A1 * | 5/2018 | Williamson | A41D 13/0012 |

* cited by examiner

Primary Examiner — Allahyar Kasraian
(74) Attorney, Agent, or Firm — Perkins Coie LLP

(57) ABSTRACT

Embodiments of the disclosed is a system comprising a wearable command center. One such embodiment comprises a case clip top portion; a chest mount bottom portion; a hinge member assembly; a connector cartridge assembly; a case; and at least one structural guide rail.

26 Claims, 22 Drawing Sheets

METHODS AND APPARATUS FOR A WEARABLE COMMAND CENTER

PRIORITY CLAIM

This application claims the benefit of and priority to U.S. Provisional Patent Application No. 62/892,189, filed on Aug. 27, 2019, entitled "Methods and Apparatus for a Wearable Command Center" the contents of all of which are hereby incorporated by reference in their entirety.

BACKGROUND

Embodiments of the disclosed technology relate generally to methods and apparatuses in the field of wearable transmitting and receiving equipment and more specifically to a wearable command center.

In today's modern warfare, soldiers need to communicate with each other or with a central command post by transmitting and receiving equipment such as smart phone or radios. These devices are typically worn on the user's body, notably in the chest area. Current wearable communication harnesses are required to hold multiple devices where those devices are wired together by multiple and unwieldy electrical cables.

The embodiments below provide an integrative, customizable and streamlined system for a wearable command center, also known as dismounted operator's combat kit ("DOCK™").

SUMMARY

An embodiment is a system comprising a wearable command center comprising a case clip top portion; a chest mount bottom portion; a hinge member assembly; a connector cartridge assembly; a case; and at least one structural guide rail.

An embodiment is a system comprising a wearable command center system comprising a case clip top portion; a chest mount bottom portion; a hinge member assembly; a connector cartridge assembly; a case; a powered hub module; and at least one structural guide rail.

Other embodiments of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the embodiments may be shown exaggerated or enlarged to facilitate an understanding of a particular embodiment.

DETAILED DESCRIPTION OF THE EMBODIMENTS

Detailed descriptions of the illustrative embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
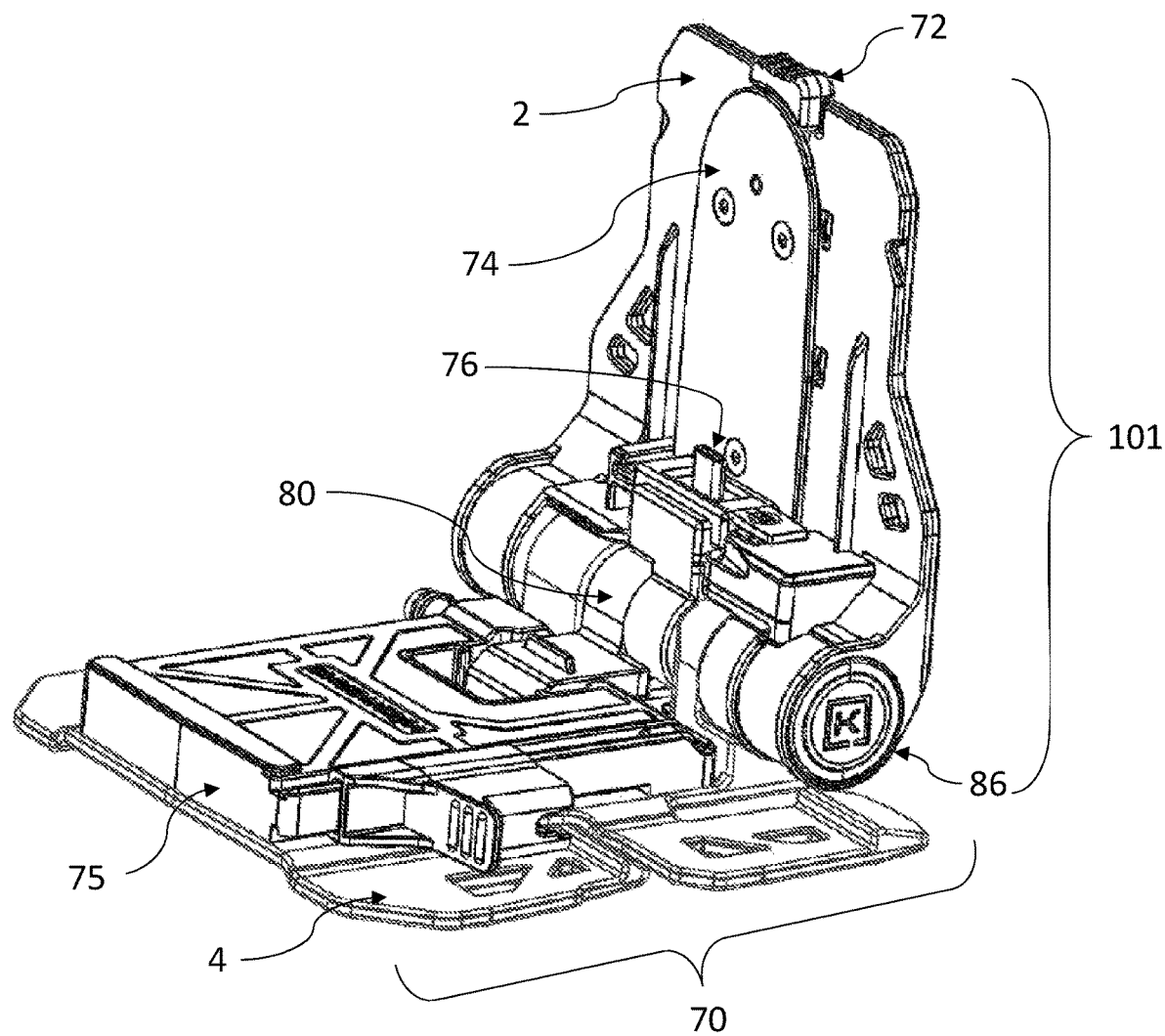
FIG. 1 is a perspective view of an illustrative embodiment with the case removed.
Figure 2:
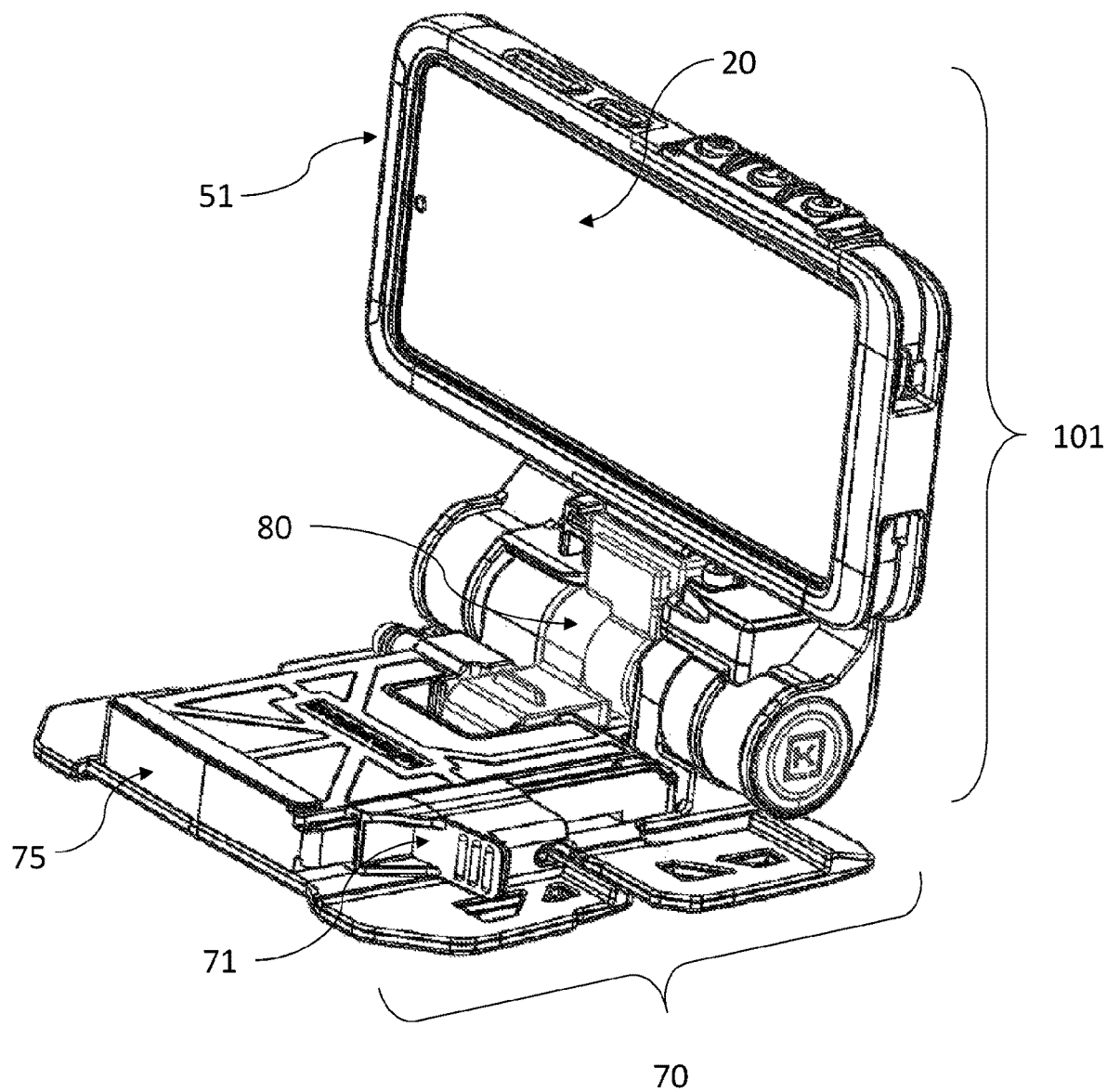
FIG. 2 is a perspective view of an illustrative embodiment with the case installed.
Figure 3:
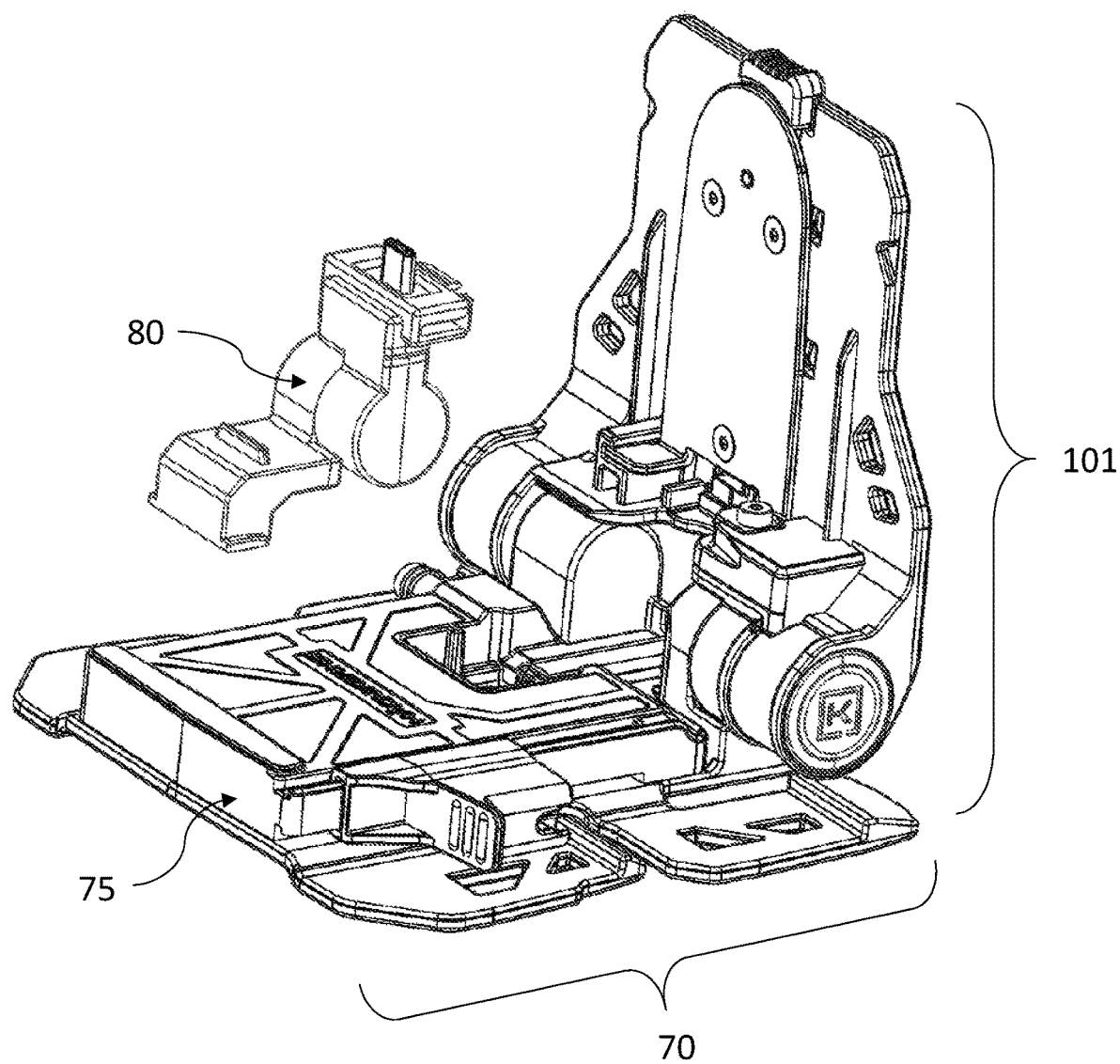
FIG. 3 is a perspective view of an illustrative embodiment with the case removed, with the connector cartridge assembly exploded.
Figure 4:
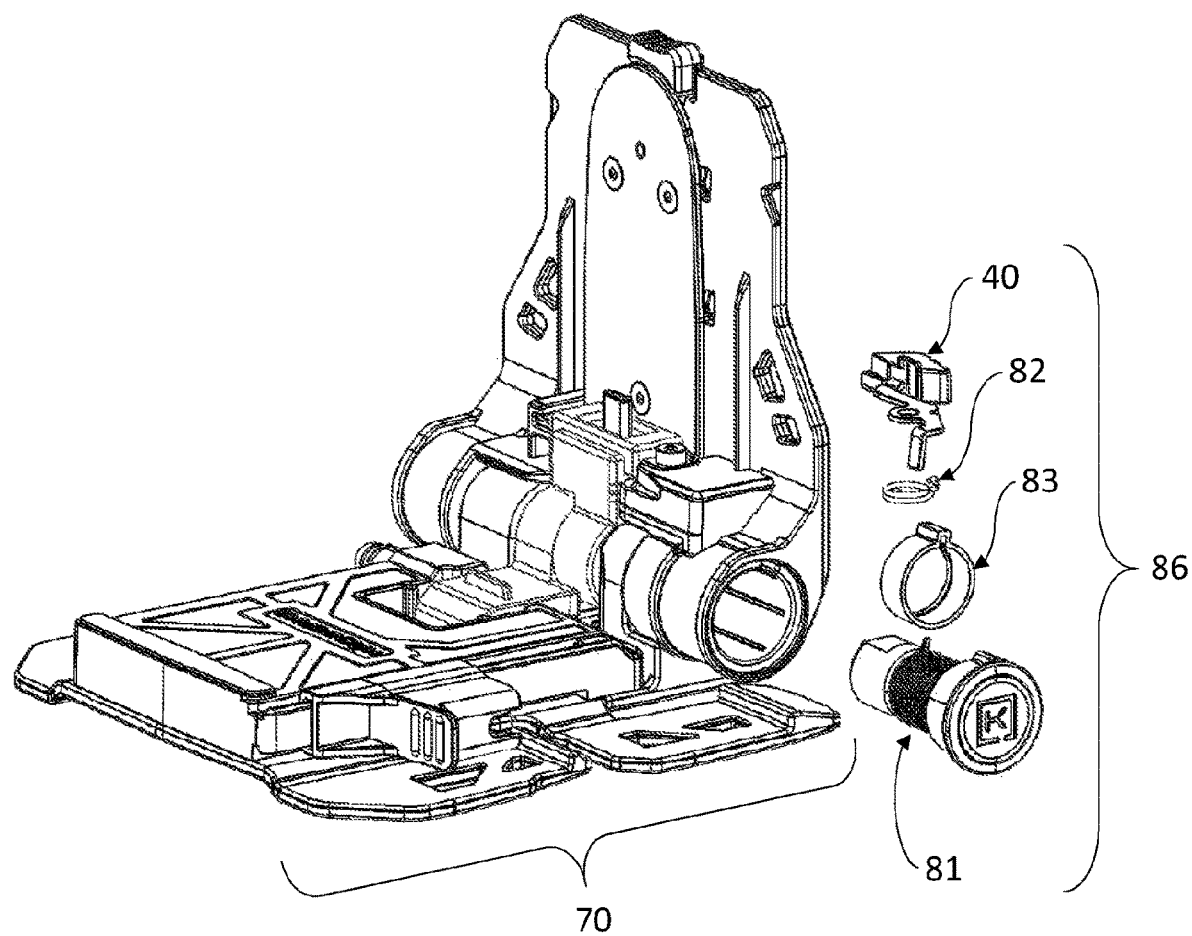
FIG. 4 is a perspective view of an illustrative embodiment with the case removed, with the hinge member assembly exploded.
Figure 5:
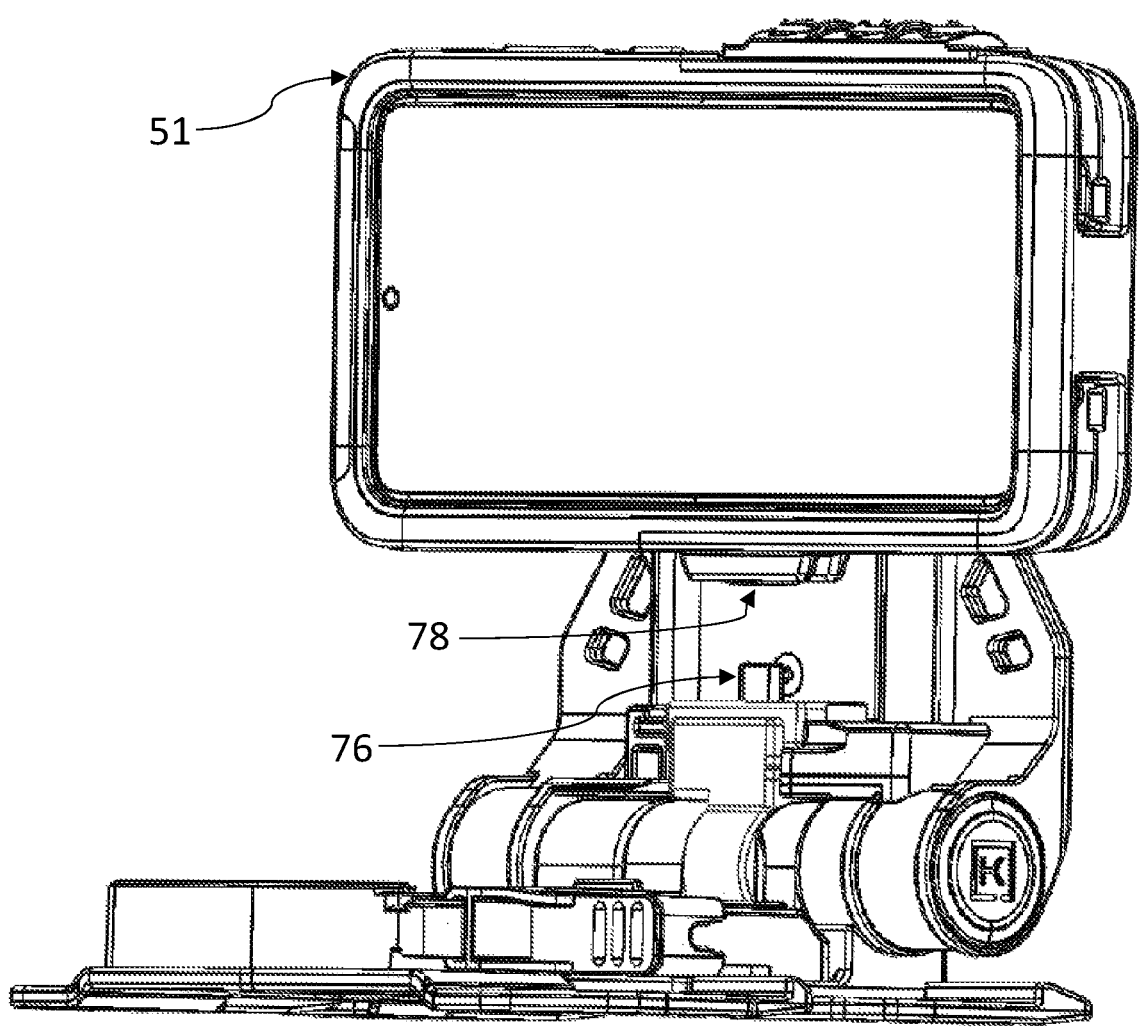
FIG. 5 is a perspective view of an illustrative embodiment with the case partially removed.

Referring now to FIGS. 1, 2, 3, 4 and 5, we see a perspective view of an illustrative embodiment of an apparatus, constructed of several injection molded plastic components, including but not limited to polycarbonate, ready to have a case 51 of a range of sizes, including but not limited to a range of approximately 6.5 to 7.0 inches long, approximately 3.3 to 3.5 inches wide, approximately 0.60 to 0.75 inches thick, installed, utilizing a guide rail 16 and locking guide rail 17, as shown in FIG. 2. The case clip top portion 101, approximately 3 inches long, and 4 inches in width, holds the case 51, which in turn holds a display screen 20, such as the screen of a smart phone, or other transmitting and receiving device such as a radio transmitter or receiver, powered USB hub, tablet, USB power bank, or a computer module. In some embodiments, the case, such as phone case, can be "ruggedized."

"Ruggedized" means, in some embodiments, that ruggedized phone case 51 can withstand a variety of conditions, including but not limited to at least one of the following conditions: fully submersible up to 1 meter for 30 minutes; fully operable at all altitudes from sea level to 9,754 meters (ambient equivalent altitudes from sea level to 15,240 meters); fully operable at extreme temperatures and can withstand extreme temperature swings; can withstand a 48 inch drop onto plywood covered concrete.

The chest mount bottom portion 70 includes a modular lightweight load-carrying equipment ("molle") mount component 4, which comprises apertures 30, 32, 34, 36, (in some embodiments, each aperture is approximately 2 inches in length, 1 inch in width, and ⅛ inch thick), that allow the invention to be interlocked into a molle vest. The apertures 30, 32, 34, 36 have extending tab features that deflect and snap into the molle vest loops when the chest mount bottom portion 70 slides onto the molle vest. The electronics housing assembly 75, can accept input and output power, in some embodiments, between 5.25 VDC to 20 VDC to be compatible with the integrated soldier power and data distribution system specification, is built to withstand the abuses of harsh environments. In some embodiments, the electronics housing assembly 75 has integrated perimeter O-ring seals of 1/16 inch square cross section, or hermetically sealed methods to insulate the electronics from liquid and debris intrusion.

The case clip top portion 101 and chest mount bottom portion 70 are connected by torque hinge members 86 and 87. In some embodiments, the torque hinge member 86 provides approximately ~2.8 N m of torque, and torque hinge member 87 provides ~1.4 N m of torque. The hinge assembly member 86 is comprised of a locking torque hinge 81, coupled to a hinge spring actuator 83, hinge lever button 40, and hinge lever spring 82. The hinge lever button 40, a plastic overmolded sheet metal component, engages the hinge spring actuator 83, a metal spring component, when depressed, which rotates the self-clinching spring on the locking torque hinge 81, an overmolded metal assembly. With the hinge lever button 40 depressed, the hinge assembly member 86 allows the operator to rotate the case clip top portion 101 between 0 to 180 degrees. With the hinge lever button deactivated, the case clip top portion 101 locks in place, but will still rotate when additional force is applied by the operator.

A single structural guide rail 74, constructed, in some embodiments, of metal or carbon composite, is fastened to the case clip 2, which provides a mounting system for a case 51, tablet, or powered module to be electrically and mechanically docked. The structural guide rail 74 integrates with the adjoining rail components on the case 51, which allows for proper alignment and docking of the case connector 78 into the case clip connector 76. The case clip spring actuated release lever 72 allows the case 51 to be mechanically locked in place until the operator rotates the lever slightly, allowing the case 51 to be pulled out of the case clip top portion 101.

Comprised of two connectors electrically connected to a flex harness, contained in an injection molded plastic housing, the connector cartridge assembly 80 provides a data and power connection between the electronics housing assembly 75 and the case 51. In some embodiments, the connector cartridge assembly 80 is ruggedized, which is sealed to prevent liquid or debris ingress. The connector cartridge assembly 80 can rotate between 0 to 180 degrees with the case clip top portion 101. The connector cartridge assembly 80 can be installed and removed from the case clip top portion 101 and the chest mount bottom portion 70 without the use of specialized tools. This allows for fast and easy exchange in the event the connector cartridge assembly 80 is damaged during operational use.

A cable, (in some embodiments, flex harness, flexible printed circuity cable, flexible flat cable, or wires internal), to the case 51 connect the standard port of the display screen 20 to the case connector 78. The resulting connection point between the connector cartridge assembly 80 and the case 51 is much stronger and less prone to breakage than a standard USB port.

A power and data transmission connector 79 is located at the side of the electronics housing assembly 75. A power and data connector 73 is located on the opposite side of the electronics housing assembly 75, coupled with a USB retainer 71, which fully encapsulates and restrains a mating cable assembly.

Figure 6:
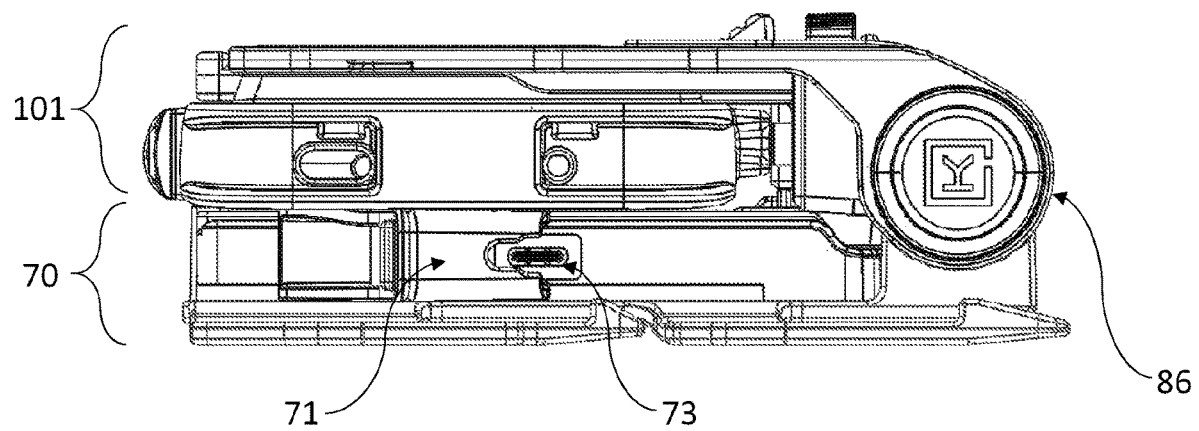
FIG. 6 is a right-side view of an illustrative embodiment.

FIG. 6 is a right-side view of an embodiment showing the case clip top portion 101 and chest mount bottom portion 70 in the closed and locked position, in close proximity to each other.

Figure 7:
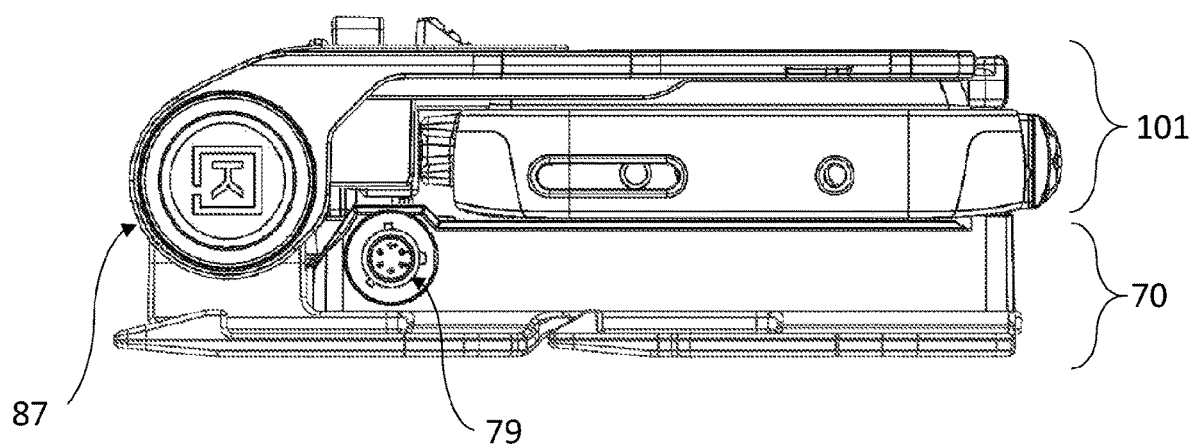
FIG. 7 is a left-side view of an illustrative embodiment.

FIG. 7 is a left side view of an embodiment showing the case clip top portion 101 and chest mount bottom portion 70 in the closed and locked position, in close proximity to each other.

Figure 8:
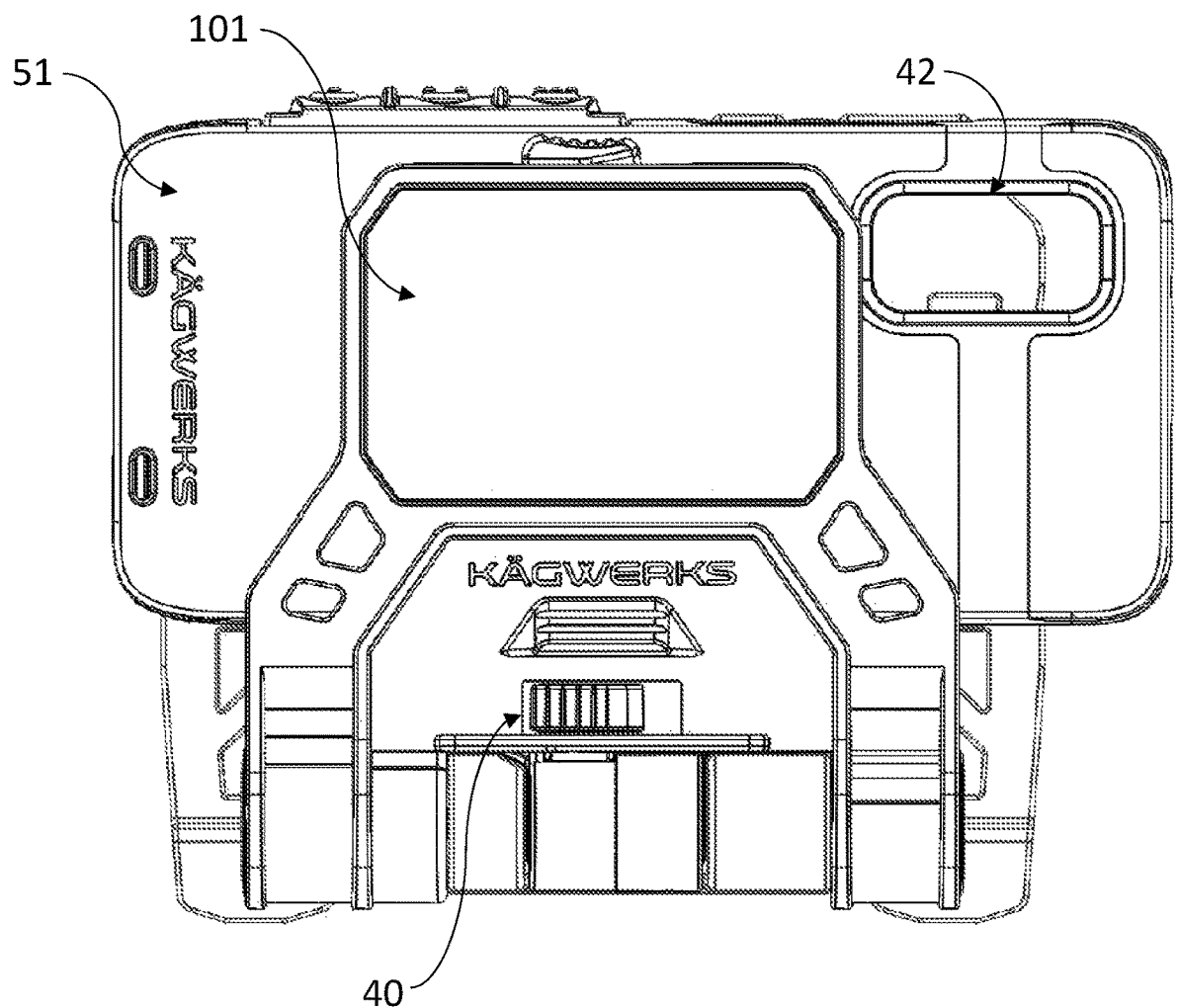
FIG. 8 is a top view of an illustrative embodiment.

FIG. 8 is a top view of an embodiment showing an aperture in case 51 allowing sufficient camera lens clearance 42 to be exposed for photography purposes.

Figure 9:
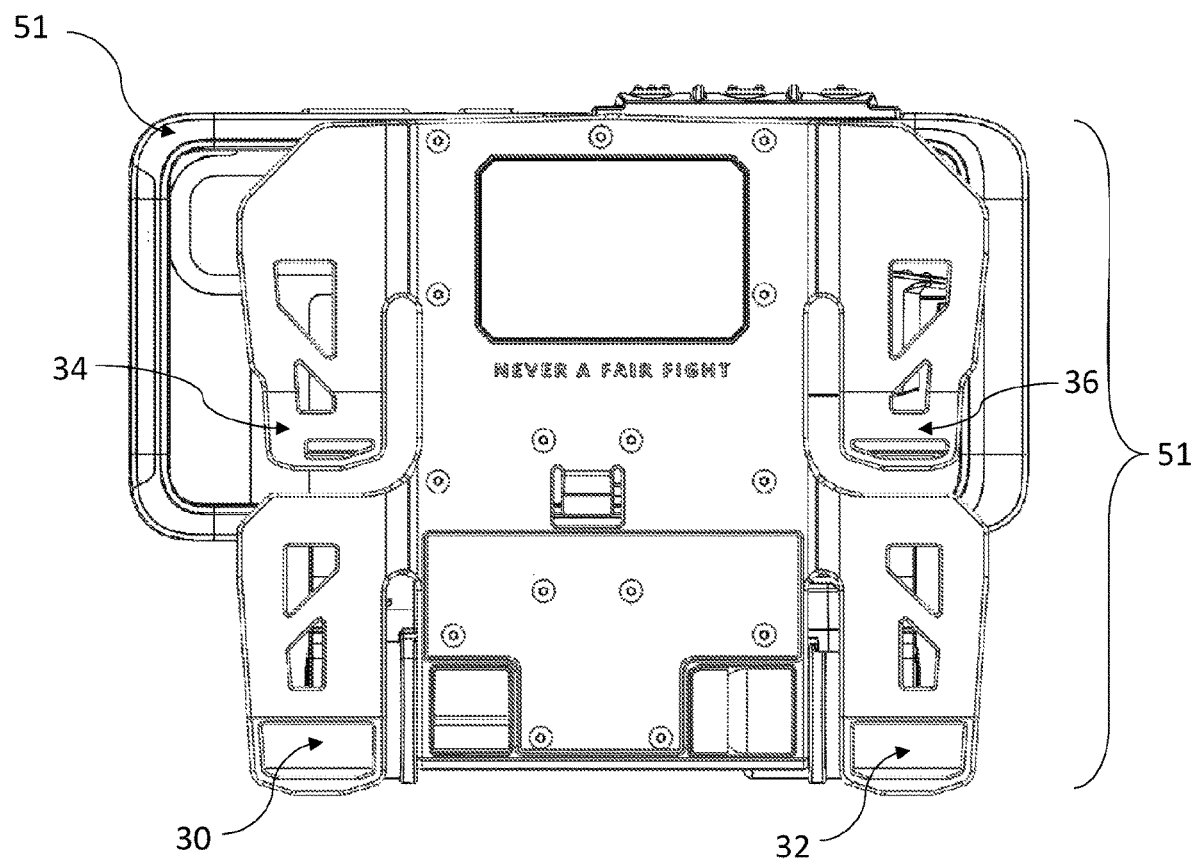
FIG. 9 is a bottom view of an illustrative embodiment.

FIG. 9 is a bottom view of an embodiment. Apertures 30, 32, 34, 36 allow the entire device to be strapped onto the torso of a user.

Figure 12:
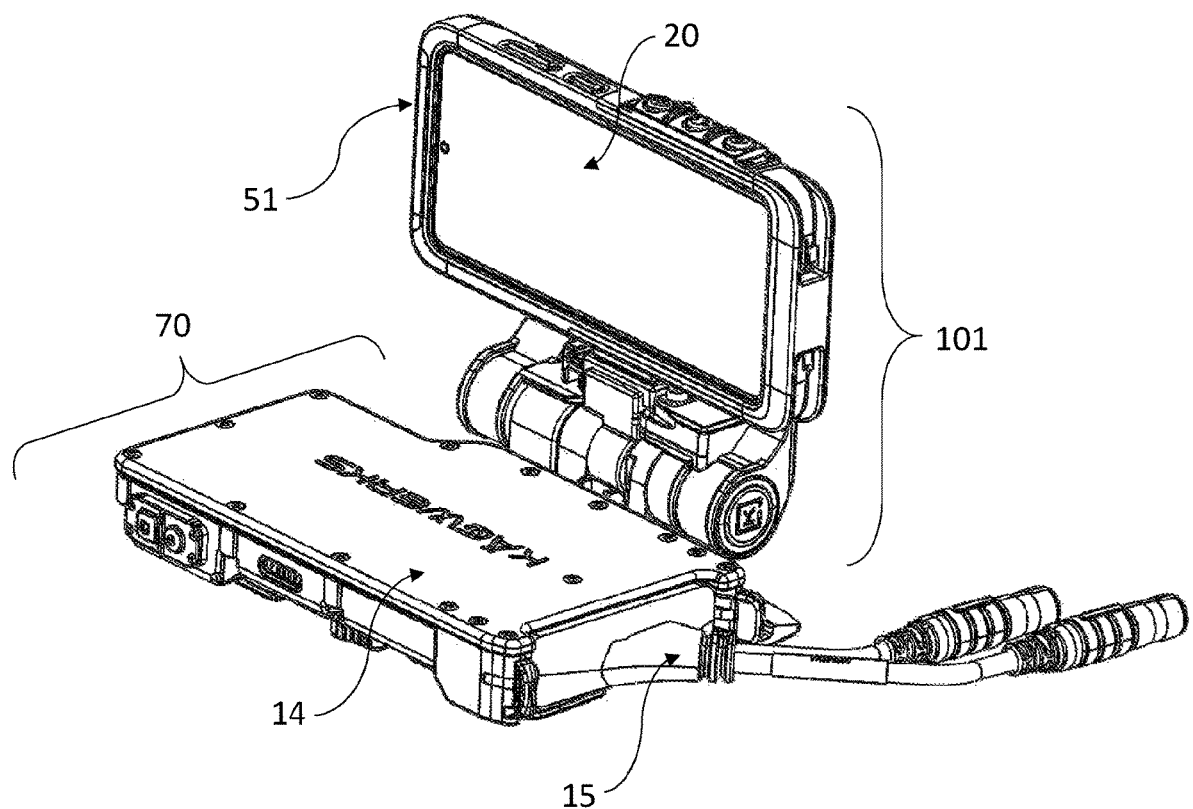
FIG. 12 is a perspective view of an illustrative embodiment with a powered hub module and the case installed.
Figure 13:
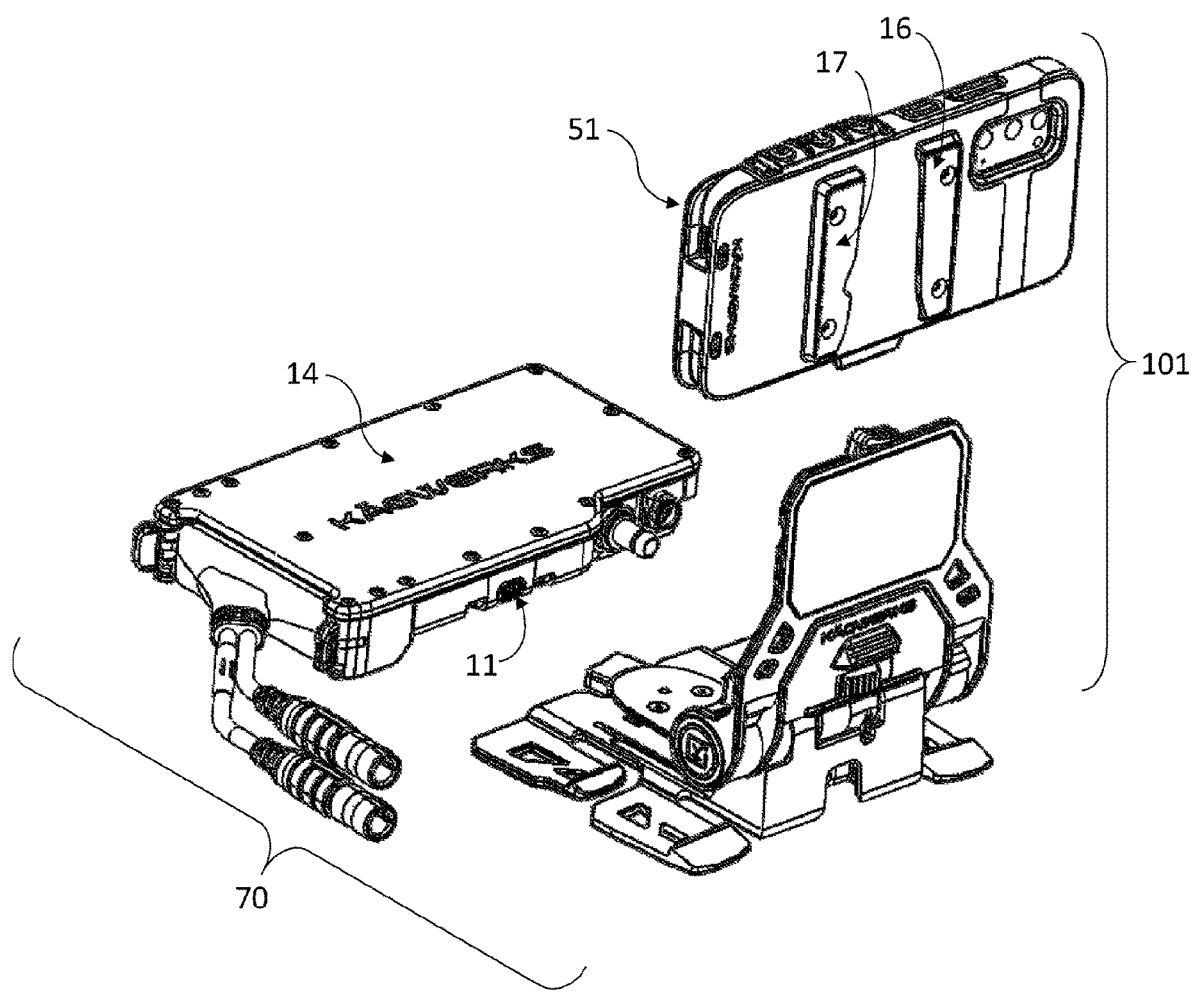
FIG. 13 is a perspective view of an illustrative embodiment with a powered hub module and the case exploded.

Referring now to FIGS. 10, 11, 12, 13, 14, 15, and 16, we see a perspective view of another illustrative embodiment of an apparatus ready to have a case 51 and powered hub module 14 installed as shown in FIG. 12. The powered hub module 14, can be constructed with, in some embodiments, an injection molded composite or metal housing, and is, in some embodiments, approximately 7 inches long, 4 inches wide, 1 inch deep. The powered hub module 14 can accept input and output power, in some embodiments, between 5.25 VDC to 20 VDC to be compatible with the integrated soldier power and data distribution system specification. The case clip top portion 101 holds the case 51 which in turn holds a display screen 20, such as the screen of a smart phone, or other transmitting and receiving device such as a radio transmitter or receiver, powered USB hub, tablet, USB power bank, or a computer module. In some embodiments, the case may be "ruggedized." "Ruggedized" means, in some embodiments, that ruggedized case 51 can withstand a variety of conditions, including but not limited to at least one of the following conditions: fully submersible up to 1 meter for 30 minutes; fully operable at all altitudes from sea level to 9,754 meters (ambient equivalent altitudes from sea level to 15,240 meters); fully operable at extreme temperatures and can withstand extreme temperature swings; and can withstand a 48 inch drop onto plywood covered concrete.

Figure 10:
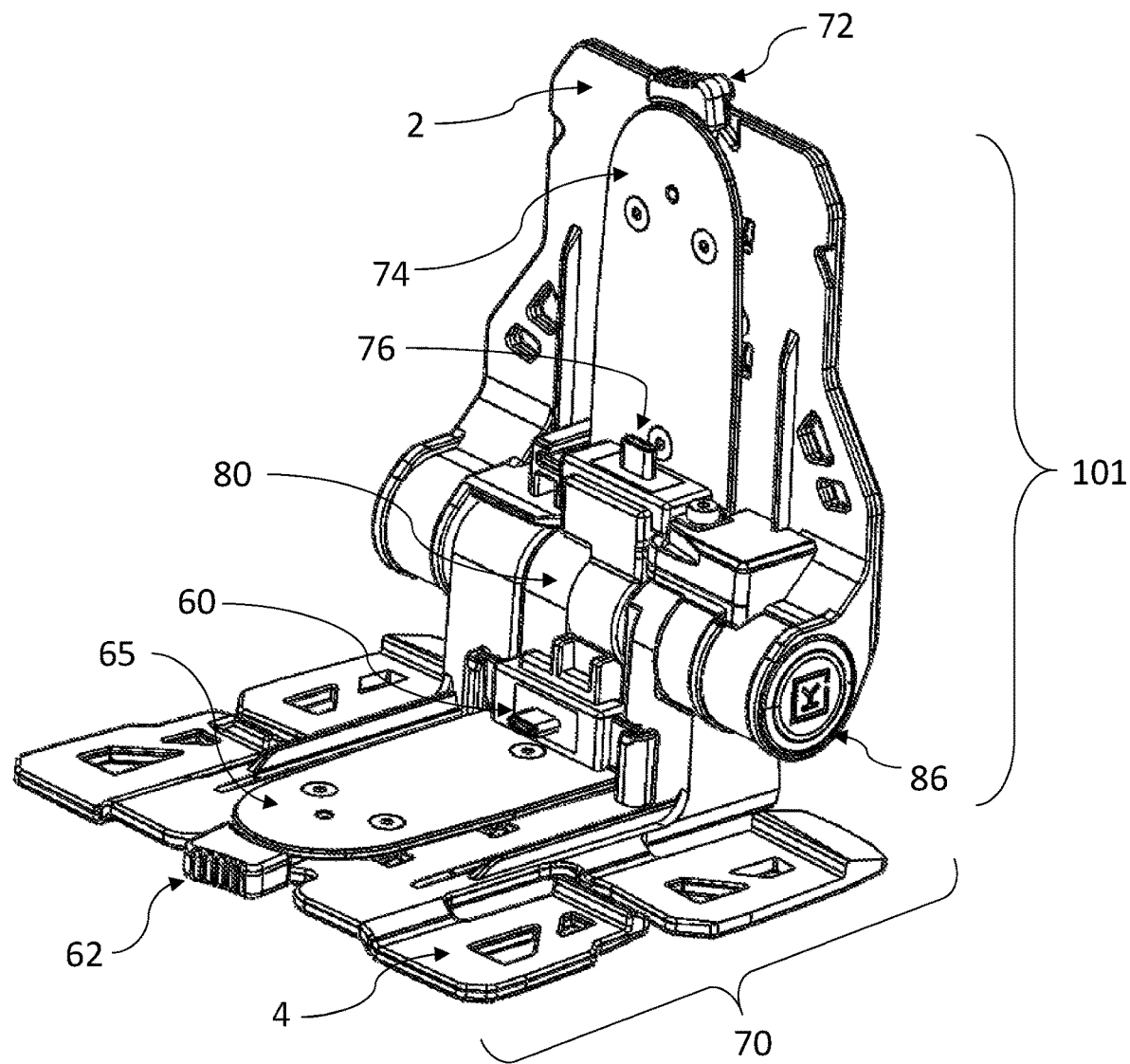
FIG. 10 is a perspective view of an illustrative embodiment with a case and powered hub module removed.
Figure 11:
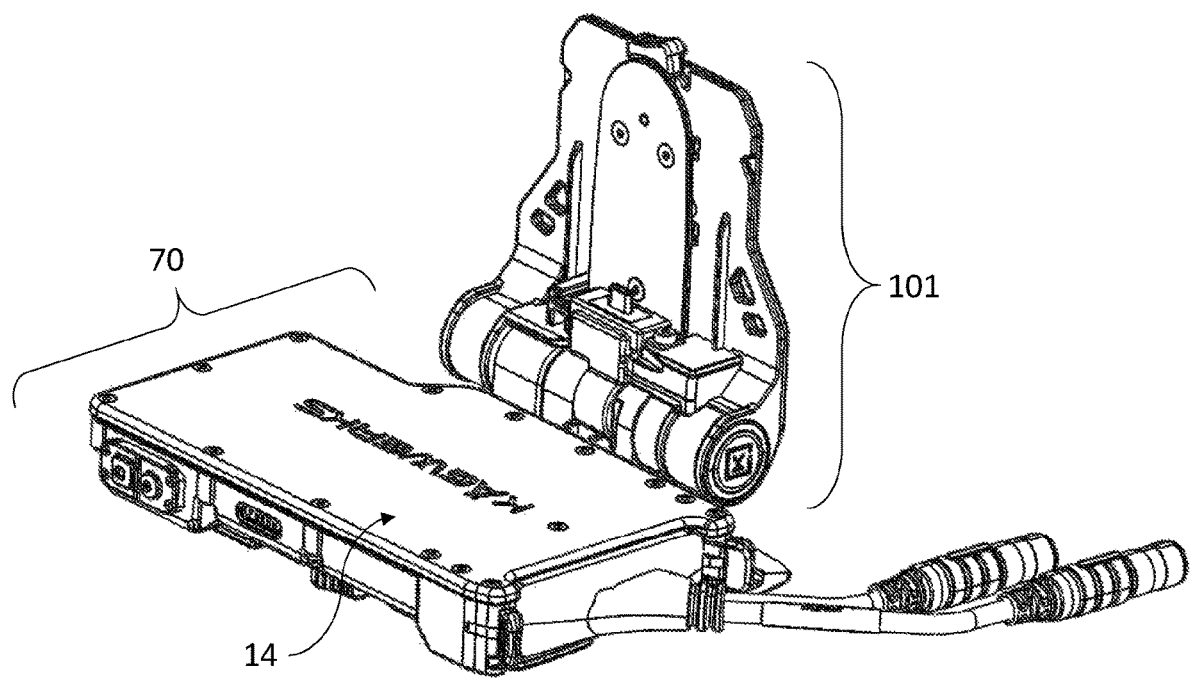
FIG. 11 is a perspective view of an illustrative embodiment with a powered hub module installed.

As shown in FIG. 10, a structural guide rail 74 is fastened to the case clip 2, which provides a mounting system for a case 51, tablet, or powered module to be electrically and mechanically docked. A secondary structural guide rail 65 is fastened to the molle mount 4, which provides a mounting system for a case 51, tablet, or powered hub module 14 to be electrically and mechanically docked, utilizing a case guide rail 16 and case locking guide rail 17. The structural guide rail 74 integrates with the adjoining rail components on the case 51, which allows for proper alignment and docking of the case connector 78 into the case clip connector 76. The case clip spring actuated release lever 72 allows the case 51 to be mechanically locked in place until the operator rotates the lever slightly, allowing the case 51 to be pulled out of the case clip top portion 101. The structural guide rail 65 integrates with the adjoining rail components on the powered hub module 14, which allows for proper alignment and docking of the powered hub module connector 11 into the molle mount connector 60. The molle mount spring actuated release lever 62 allows the powered hub module 14 to be mechanically locked in place until the operator rotates the lever slightly, allowing the powered hub module 14 to be pulled out of the chest mount bottom portion 70.

As shown in FIG. 12, the chest mount bottom portion 70 includes a molle mount 4, which comprises apertures 30, 32, 34, 36 that allow the entire device to be interlocked into a molle vest. The powered hub module 14 is built to, in some embodiments, withstand the abuses of harsh environments, with integrated O-ring seals to insulate the electronics from liquid and debris intrusion. In some embodiments, the power module 14 provides USB power between 3.3 VDC to 5 VDC.

Figure 14:
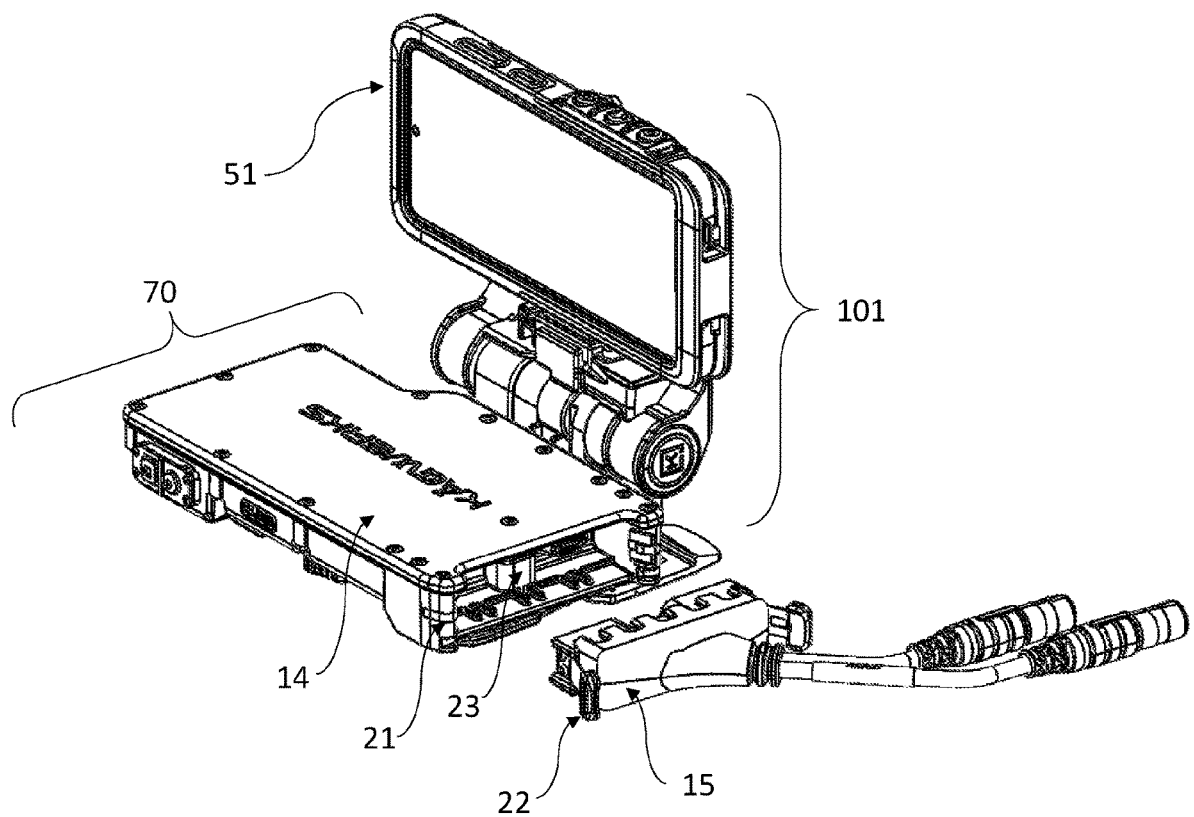
FIG. 14 is a perspective view of an illustrative embodiment with a multi-port hub snap module exploded from powered hub module, with a case installed.
Figure 15:
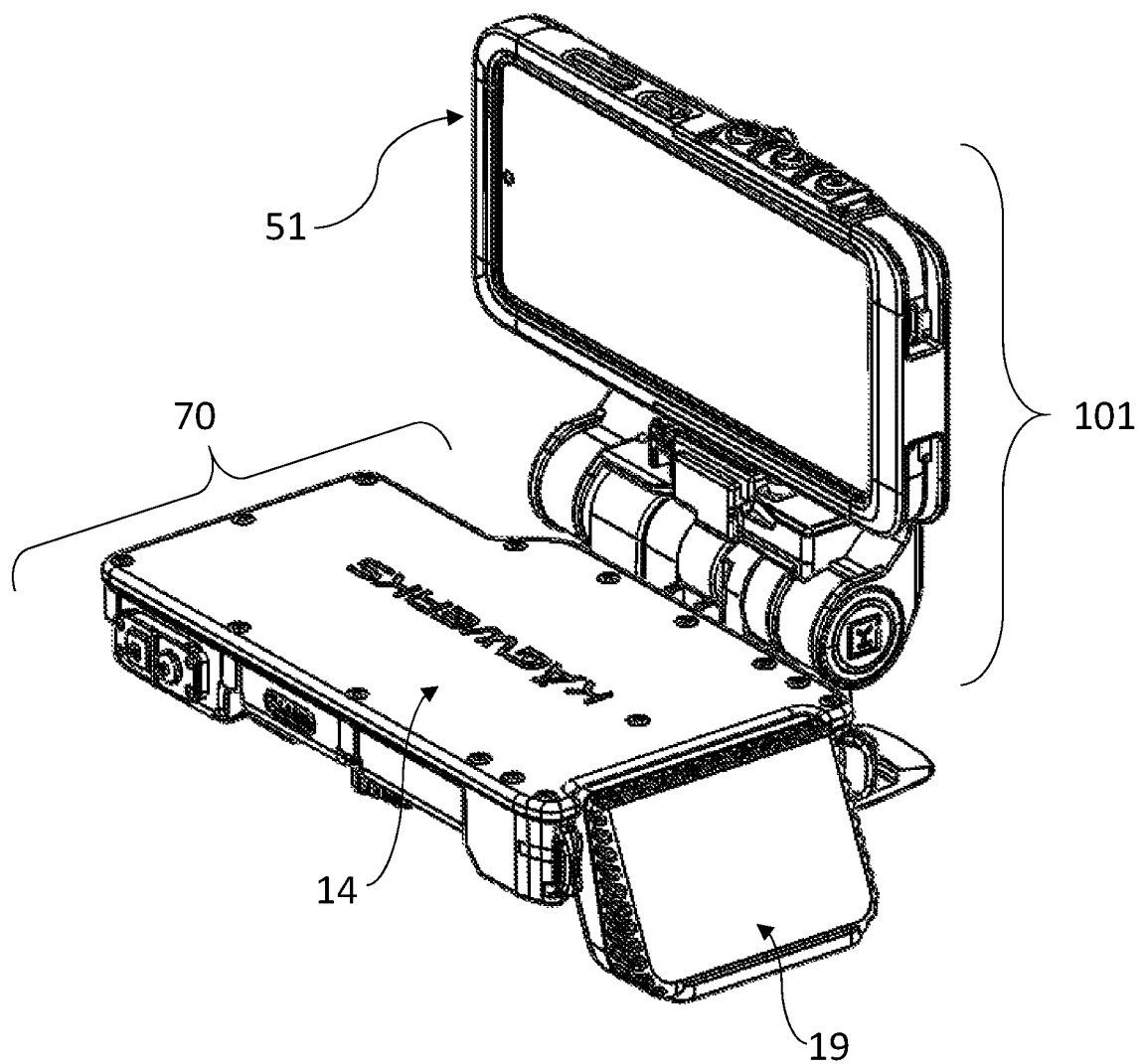
FIG. 15 is a perspective view of an illustrative embodiment with a powered hub module, with a radio snap module and a case installed.
Figure 16:
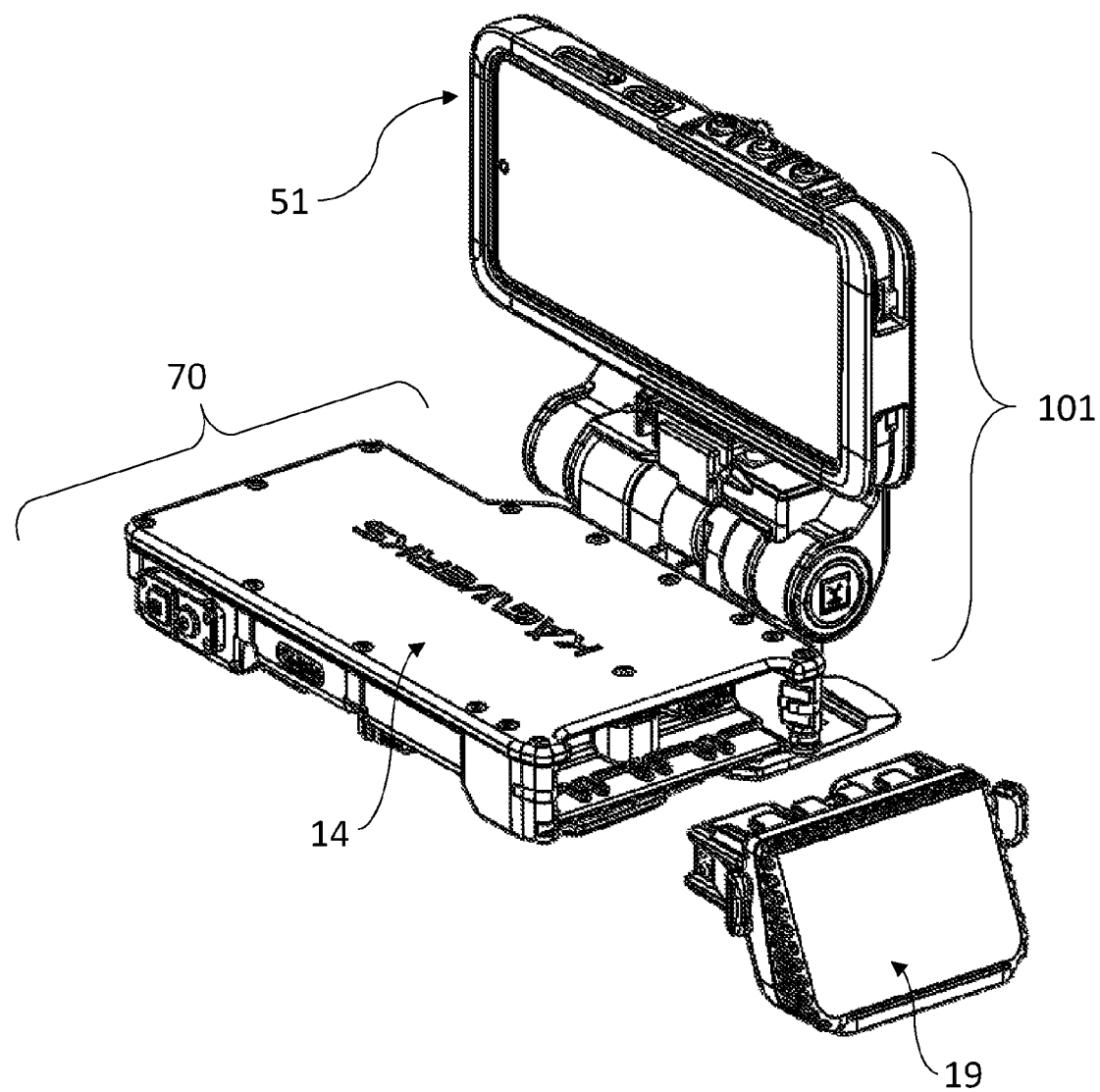
FIG. 16 is a perspective view of an illustrative embodiment with a radio snap module exploded from a powered hub module, with the case installed.

As shown in FIG. 14, the powered hub module 14 comprises a cartridge interface 23 that provides a power and data connection to an auxiliary snap module. The multi-port hub snap module 15 and radio snap module 19, include mechanical spring locks 22 allowing the assembly to slide and mechanically lock into keyways 21 within the cartridge interface 23 of the powered hub module 14.

Figure 21:
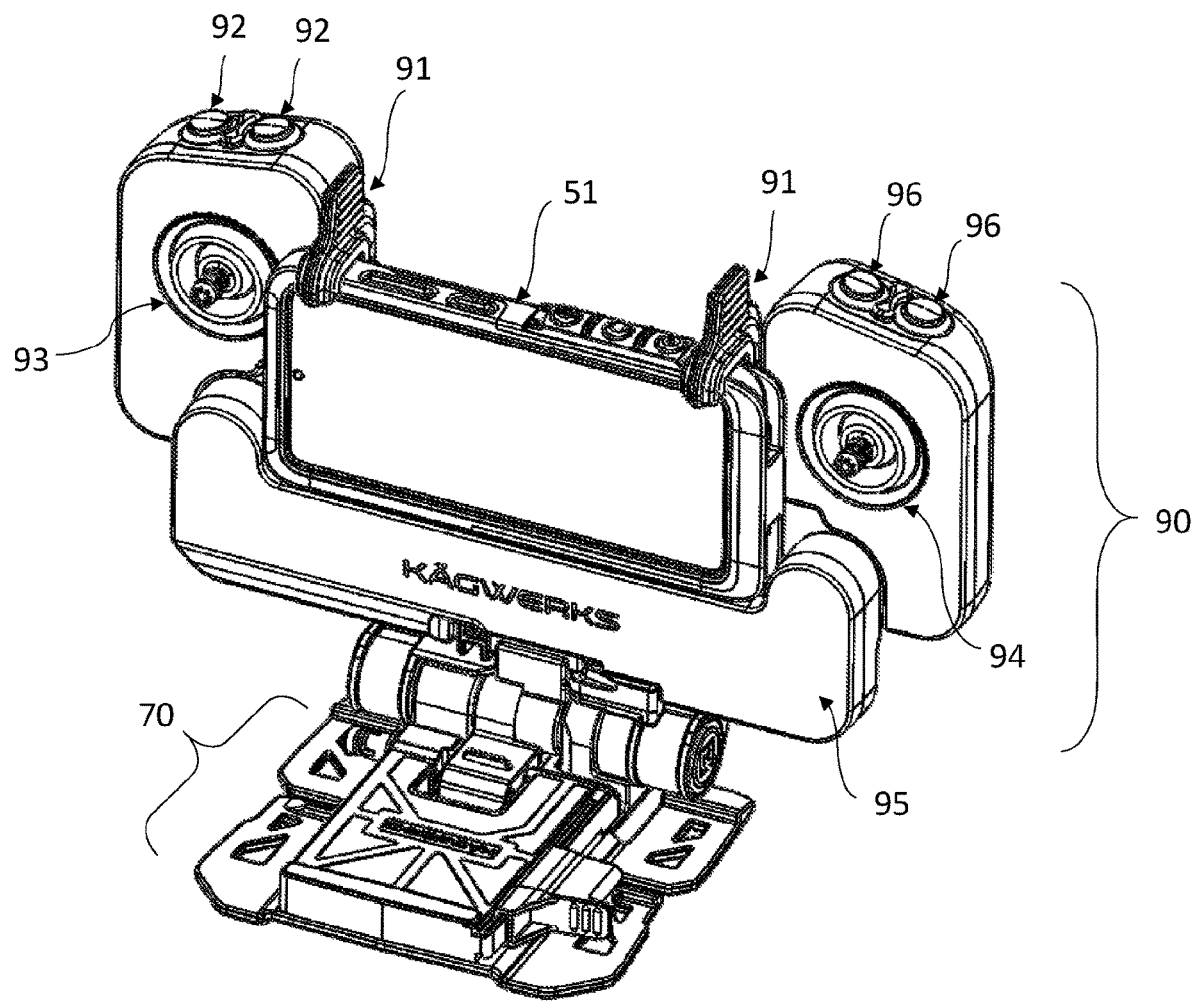
FIG. 21 is a perspective view of an illustrative embodiment with a case installed into a ground control station.

As shown in FIG. 21, the ground control station 90 accessory mechanically attaches to the case clip top portion 101 with a combination of a case guide rail 16 and case locking guide rail 17, coupled with two phone case restraint mechanisms 91, which can contact the top portion of the case 51, fully cradling the case 51 in all axes, preventing the case 51 from rotating. The case restraint mechanisms 91 provide a mechanical connection with the ground control station 90, to ensure any physical impact will not disengage the electrical connectors. The ground control station 90 electrically connects to the case 51 by mating the case connector 78 to the ground control station case connector 97. The ground control station electronics housing 95 incorporates a connector that interfaces with the case clip connector 76 when installed into the case clip top portion 101. The ground control station comprises a left control stick 93 and right control stick 94, and control buttons left 92, and control buttons right 96, which allows user inputs into an interface control system within the display screen 20. The left control stick 93 and right control stick 94, provide a gimballed user interface for the operator to manipulate and control an unmanned aircraft vehicle, unmanned ground vehicle, or remote sensor system.

Figure 17:
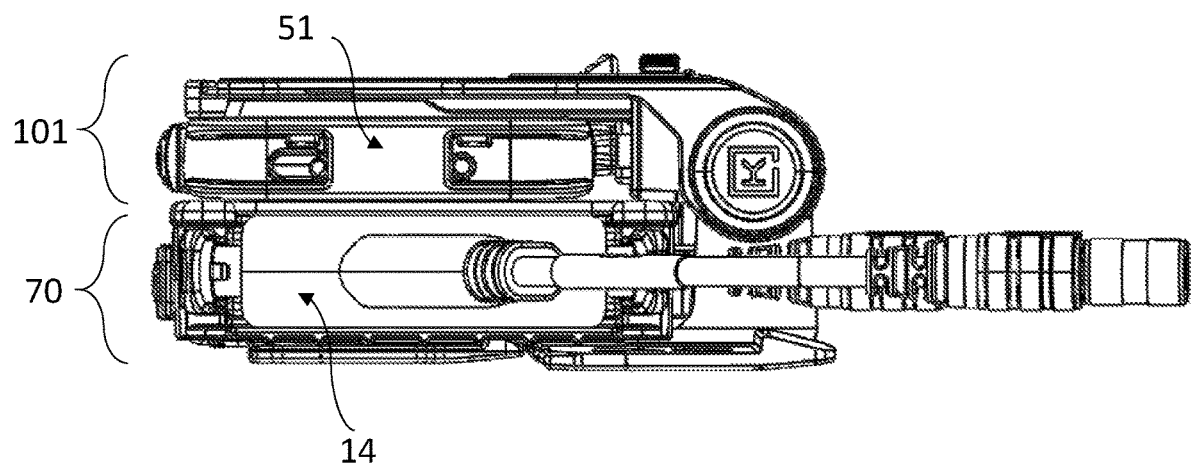
FIG. 17 is a right-side view of an illustrative embodiment.

FIG. 17 is a right-side view of the invention showing the case clip top portion 101 and chest mount bottom portion 70 in the closed and locked position, in close proximity to each other.

Figure 18:
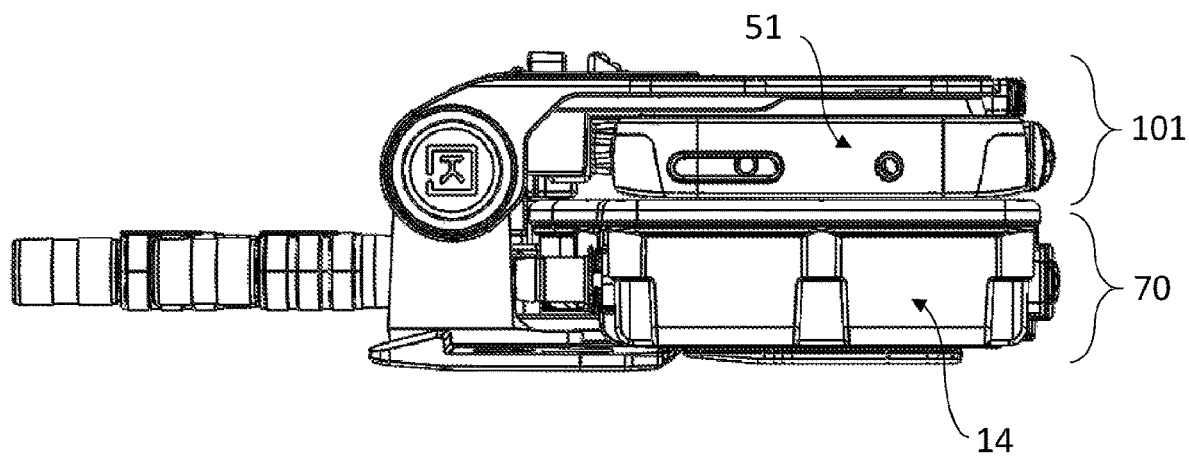
FIG. 18 is a left-side view of an illustrative embodiment.

FIG. 18 is a left side view of the invention showing the case clip top portion 101 and chest mount bottom portion 70 in the closed and locked position, in close proximity to each other.

Figure 19:
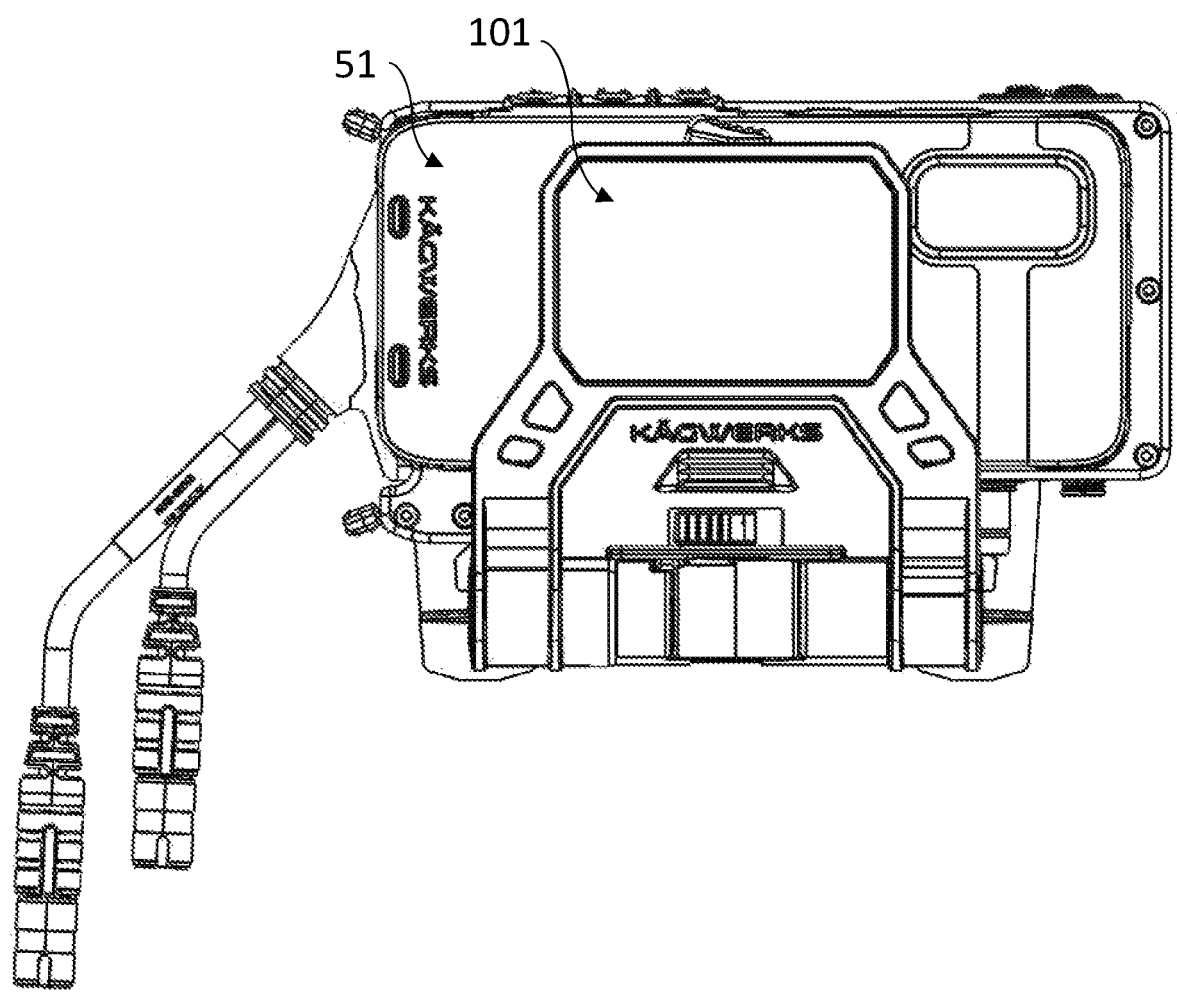
FIG. 19 is a top view of an illustrative embodiment.

FIG. 19 is a top view of the invention showing the case clip top portion 101 and chest mount bottom portion 70 in the closed and locked position, in close proximity to each other.

Figure 20:
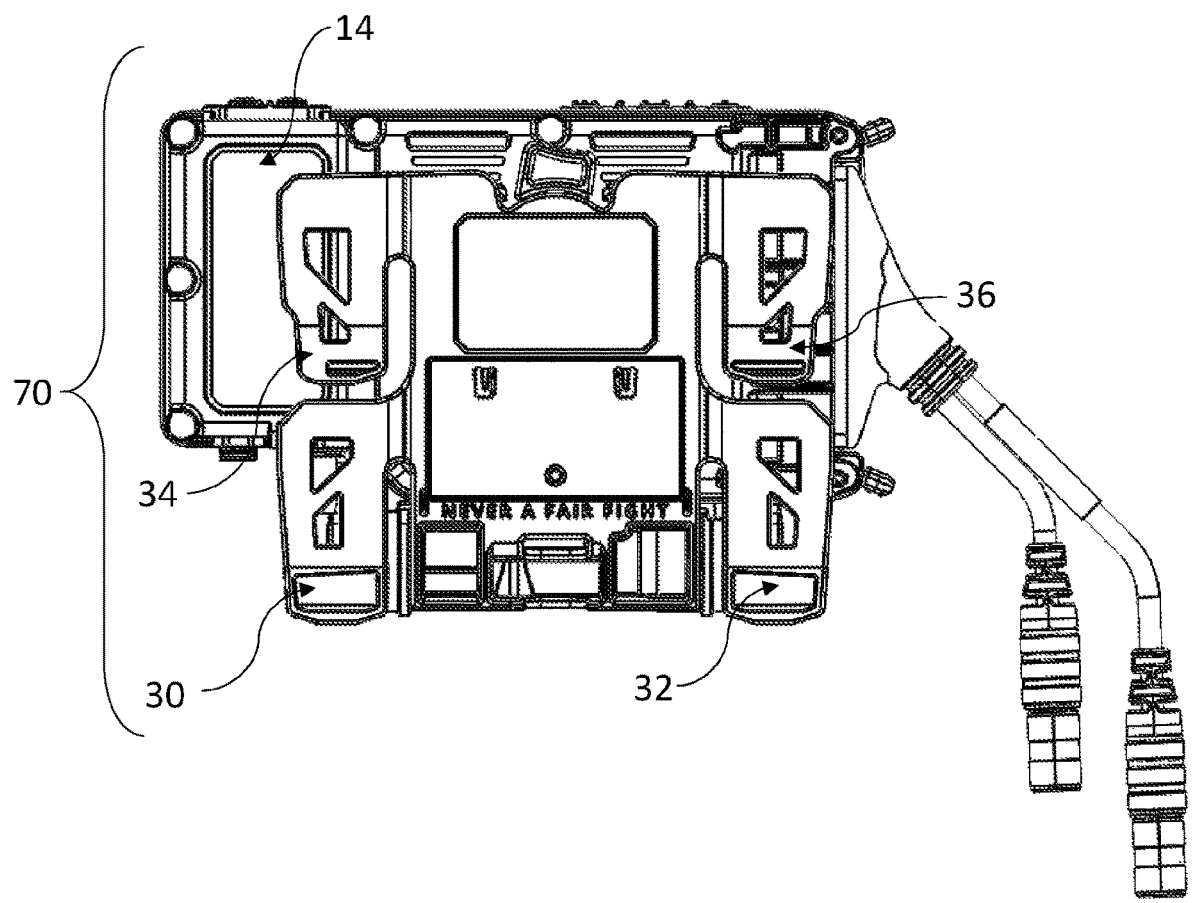
FIG. 20 is a bottom view of an illustrative embodiment.

FIG. 20 is a bottom view of the invention. Apertures 30, 32, 34, 36 allow the entire device to be strapped onto the torso of a user.

FIG. 21 is a perspective view of the invention that integrates case 51 with a ground control station 90 accessory fully installed.

Figure 22:
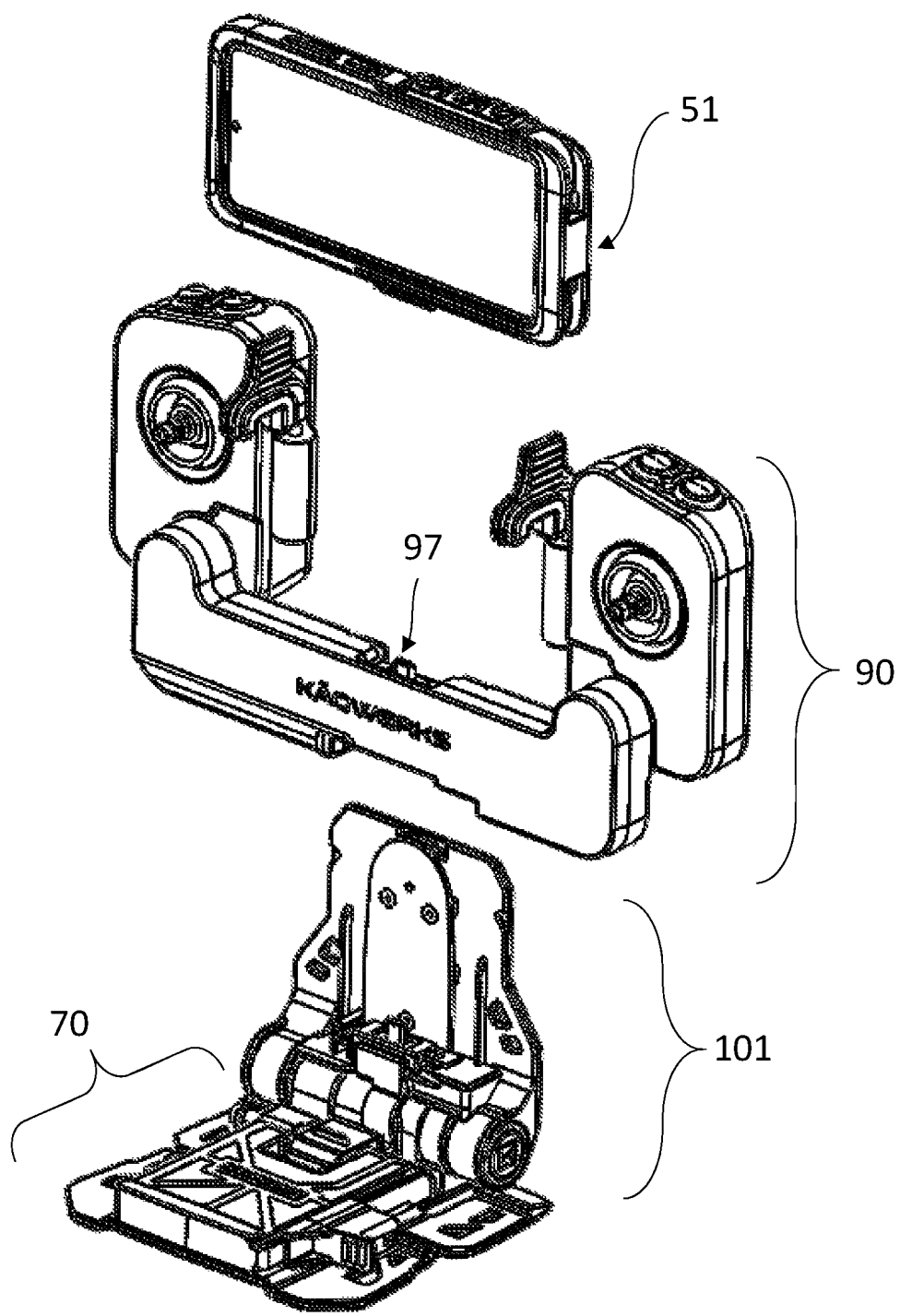
FIG. 22 is a perspective view of an illustrative embodiment with a case and a ground control station exploded.

FIG. 22 is an exploded perspective view of the invention that integrates case 51 with a ground control station 90 accessory.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A wearable command center system, comprising:
   a case clip top portion;
   a guide rail attached to the case clip top portion;
   a case with connection rail configured to mate with the quide rail to releasably retain the case on the case clip portion, the case configured to receive a first electronic device;
   a chest mount bottom portion having connection tabs configured to removably mount to a wearable garment, the chest mount bottom portion configured to support a second electronic device;
   a hinge member assembly pivotably coupling the case clip top portion to the chest mount bottom portion, the hinge member assembly being releasably positionable to retain the case clip portion in a selected fixed angular orientation relative to the chest mount bottom portion; and
   a connector cartridge assembly coupled to the hinge member assembly and configured to allow the case clip portion to pivot relative to the chest mount bottom portion, the connector cartridge assembly having at least one electrical case clip connector couplable to the case and configured to electrically interconnect the first and second electronic devices.

2. The system of claim 1, wherein the case is ruggedized.

3. The system of claim 1, wherein the case is a smart phone case.

4. The system of claim 1, wherein the chest mount bottom portion comprises a modular lightweight load-carrying equipment.

5. The system of claim 4, wherein the modular lightweight load-carrying equipment comprises at least one aperture.

6. The system of claim 1, wherein the hinge member assembly comprises a locking torque hinge, a hinge spring actuator, hinge lever button, and a hinge lever spring.

7. The system of claim 1, wherein the hinge member assembly is configured to allow the case clip top portion to pivot through a range of approximately 0°-180° relative to the chest mount bottom portion.

8. The system of claim 1, further comprising an electronics housing assembly comprising the second electronic device and that is mounted to the chest mount bottom portion. wherein the electronics housing assembly is coupled to the connector cartridge assembly and configured to be electrically connected to the first electronic device through the connector cartridge assembly.

9. The system of claim 1, further comprising a releasable locking assembly coupled to the case clip top portion and releasably connectable to the case, the releasable locking assembly being configured to releasably lock the case to the case clip top portion with the quide rail in mating engagement with the connection rail.

10. The system of claim 1, wherein the connector cartridge assembly is removably connected to the hinge member assembly and the case clip top portion.

11. The system of claim 1, wherein the connector cartridge assembly has a mount connector electrically connected to the electrical case clip connector and configured to releasably connect to the second electrical device.

12. The system of claim 1, further comprising the second electrical device, wherein the second electrical device is a powered hub module configured for communication with the first electrical device when the first electrical device is installed in the case.

13. The system of claim 1, wherein the guide rail is a first guide rail, and further comprising a second guide rail attached to the chest mount bottom portion and configured to releasably mate with the second electrical device to hold the second electrical device on the chest mount bottom portion.

14. The system of claim 1, further comprising a control accessory connected to the case and coupled to the case clip top portion.

15. A wearable command center system comprising:
a case clip top portion;
a quide rail attached to the case clip top portion;
a case with a connection rail configured to mate with the quide rall to releasably retain the case on the case clip portion, the case configured to receive a first electronic device;
a chest mount bottom portion configured to removably mount to a wearable garment;
a powered hub module mounted on the chest mount bottom portion and configured to communicate with the first electronic device whe mounted in the case:
a hinge member assembly pivotably coupling the case clip top portion to the chest mount bottom portion, the hinge member assembly being releasably lockable to retain the case clip portion in a selected fixed angular orientation relative to the chest mount bottom portion; and
a connector cartridge assembly coupled to the hinge member assembly and configured to allow the case clip portion to pivot relative to the chest mount bottom portion, the connector cartridge assembly electrically connected to the powered hub module and having at leas one electrical case clip connector couplable to the case and configured to electrically interconnect the first electronic device to the powered hub module.

16. The system of claim 15, wherein the case is ruggedized.

17. The system of claim 15, wherein the case is a smart phone case.

18. The system of claim 15, wherein the hinge member assembly comprises a locking torque hinge, a hinge spring actuator, hinge lever button, and a hinge lever spring.

19. The system of claim 15, wherein the powered hub module is removably mounted on the chest mount bottom portion and is disconnectable from the connector cartridge assembly.

20. The system of claim 15, further comprising a first releasable locking assembly coupled to the case clip top portion and releasably connectable to the case to releasably lock the case to the case clip top portion, and a second releasable locking assembly coupled to the chest mount bottom portion and releasably connectable to the powered hub module to releasably lock the powered hub module to the chest mount bottom portion.

21. The system of claim 15, further comprising the first electronic device, wherein the first electronic device has a display contained in the case and electrically connected to the at least one electrical case clip connector.

22. The system of claim 15, wherein the connector cartridge assembly is configured to allow the case clip top portion to pivot through a range of approximately 0°-180° relative to the chest mount bottom portion while maintaining electrical connection between the first electronic device and the powered hub module.

23. The system of claim 15, wherein the guide rail is a first guide rail, and the connection rail is a first connection rail, and further comprising a second guide rail attached to the chest mount bottom portion and the powered hub module has a second connection rail configured to releasably mate with the second guide rail to releasably hold the powered hub module on the chest mount bottom portion and in electrical communication with the first electrical device.

24. The system of claim 15, further comprising a control accessory coupled to the case and to the case clip top portion.

25. The system of claim 24 wherein the control accessory is connected to the connector cartridge assembly.

26. The system of claim 24 wherein the control accessory comprises a retention member releasably coupled to the case and an electrical connector releasably connected to the case and in electrical communication with the powered hub module.

* * * * *